(12) United States Patent
Adam et al.

(10) Patent No.: US 11,658,686 B2
(45) Date of Patent: May 23, 2023

(54) CONTROL NODE WITH AN OCTAGONAL VECTOR CONSTELLATION FOR AN ARRAY ANTENNA

(71) Applicant: THALES, Courbevoie (FR)

(72) Inventors: Thierry Adam, Toulouse (FR); Stéphane Rochette, Toulouse (FR); Benjamin Therond, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/388,049

(22) Filed: Jul. 29, 2021

(65) Prior Publication Data
US 2022/0038120 A1 Feb. 3, 2022

(30) Foreign Application Priority Data
Jul. 30, 2020 (FR) ...................................... 2008056

(51) Int. Cl.
| | |
|---|---|
| *H04B 1/00* | (2006.01) |
| *H01Q 1/24* | (2006.01) |
| *H04B 1/12* | (2006.01) |
| *H04B 1/40* | (2015.01) |
| *H04B 7/08* | (2006.01) |

(52) U.S. Cl.
CPC ............ *H04B 1/0039* (2013.01); *H01Q 1/246* (2013.01); *H04B 1/123* (2013.01); *H04B 1/40* (2013.01); *H04B 7/084* (2013.01)

(58) Field of Classification Search
CPC ........ H04B 1/0039; H04B 1/123; H04B 1/40; H04B 7/084; H01Q 1/246
See application file for complete search history.

(56) References Cited

U.S. PATENT DOCUMENTS

| | | | | |
|---|---|---|---|---|
| 5,019,793 A | * | 5/1991 | McNab | ..................... H01P 5/04 333/156 |
| 5,355,103 A | * | 10/1994 | Kozak | ..................... H03H 7/20 333/81 R |
| 5,585,769 A | * | 12/1996 | Mazzochette | ............. H01P 1/18 333/156 |
| 9,960,883 B1 | * | 5/2018 | Chakraborty | .......... H03D 7/165 |
| 2017/0170556 A1 | | 6/2017 | Carey et al. | |
| 2020/0144993 A1 | | 5/2020 | Saha | |
| 2021/0005946 A1 | | 1/2021 | Rochette et al. | |
| 2021/0119707 A1 | * | 4/2021 | Dong | ............... H04B 10/50597 |

FOREIGN PATENT DOCUMENTS

| | | |
|---|---|---|
| EP | 3 324 540 A1 | 5/2018 |
| KR | 10-2011-0064892 A | 6/2011 |

* cited by examiner

*Primary Examiner* — Junpeng Chen
(74) *Attorney, Agent, or Firm* — BakerHostetler

(57) ABSTRACT

A control node for an array antenna configured so as to apply an attenuation and a phase shift to a radiofrequency signal on the basis of a control signal, to a beamforming network, to an array antenna and to a satellite includes the control node. It comprises a quadratic divider that delivers an in-phase signal and a quadrature signal on separate transmission channels, a combiner configured so as to sum the signals transmitted on two of the transmission channels, each transmission channel comprising at least: one attenuation cell activated on the basis of the value of a dedicated bit of the control signal, and one phase shift cell configured so as to apply a fixed phase shift, activated on the basis of the result of combinational logic implemented on bits of the control signal.

8 Claims, 9 Drawing Sheets

CONTROL NODE WITH AN OCTAGONAL VECTOR CONSTELLATION FOR AN ARRAY ANTENNA

CROSS-REFERENCE TO RELATED APPLICATIONS

This application claims priority to foreign French patent application No. FR 2008056, filed on Jul. 30, 2020, the disclosure of which is incorporated by reference in its entirety.

FIELD OF THE INVENTION

The invention is based in the field of radiofrequency (RF) transmissions, and relates more particularly to a device for controlling the amplitude and phase of an RF signal, or control node, used within a beamforming network for array antennas. Such array antennas are used in particular for satellite communications or for 5G (fifth generation standard for mobile telephony) devices.

BACKGROUND

Active or passive array antennas are composed of a plurality of radiating elements configured so as to emit or receive an RF signal. The amplitude and phase of the signal emitted (when the antenna is used for transmission) or received (when the antenna is used for reception) by each radiating element are adjusted so as to point the antenna beam in the desired direction.

FIG. 1 summarizes the main elements in a transmission chain comprising an array antenna, at emission. At emission, the signal is shaped by means of various algorithms 101 for processing the signal (modulation, coding, interleaving, etc.) according to the communications standard, and then converted into analogue and amplified by the emission chain 102. The RF signal that is generated is transmitted to N unitary control nodes 103, together forming a beamforming network 104. Each control node is configured so as to apply to the signal a phase shift and a particular attenuation given by a control signal. The RF signal thus modified is then emitted by a particular radiating element 105 of the array antenna 106. Choosing the amplitudes/phases applied by the control nodes makes it possible to control the radiation pattern of the antenna. The principle is the same at reception: the RF signal received by each of the radiating elements is transmitted to control nodes configured so as to apply a particular amplitude and phase to them. The resulting signals are processed by an RF reception chain, and then computing means responsible for applying various algorithms 101 for processing the signal (demodulation, decoding, de-interleaving, etc.). The radiation pattern of the antenna, both at emission and at reception, depends on the number of radiating elements and on their respective positions. Thus, antennas on board satellites generally comprise several tens of radiating elements.

Array antennas, and therefore beamforming networks, are used inter alia for on-board satellite applications in order to create satellite spots, but also for BFIC (acronym for Beam Forming Integrated Circuit) components, new-generation components that are emerging with the implementation of 5G, which are based largely on beamforming in order to improve link budgets. Whether for satellite applications or for 5G applications, it is necessary to miniaturize array antennas as far as possible. This in particular involves miniaturizing the control nodes, which are decisive elements in terms of dimensioning due to the number thereof, in terms of mass, volume and energy efficiency. This miniaturization is obtained, inter alia, by implementing silicon technology or technology based on silicon/germanium mixtures, which offer good RF performance and also low consumption, low cost and are suitable for mass production.

Each control node is controlled by a digital control signal: for each node, there is therefore a finite number of amplitude/phase states able to be achieved. All of these states form a constellation of points. For example, for a 16-bit control configuration, the constellation of points comprises 65536 different amplitude/phase states.

The majority of modern systems are based on a 16-bit control configuration, that is to say $2^{16}=65536$ amplitude/phase states, this format being compatible with standard devices for series-parallel addressing, for storing command words in memory and for calibrating the array antenna. Some application contexts (low satellite orbit, high relative frequency band, etc.) require the size of the command to be reduced to 14 bits, that is to say $2^{14}=16384$ amplitude/phase states, so as to reserve two bits from the 16 available for regulating the "group propagation time" parameter.

The control nodes have to meet resolution specifications with regard to the constellation of states. For example, the phase setpoint should generally allow a 360° scan per step of constant size, and the amplitude dynamic range should be large (typically larger than 20 dB).

To this end, control nodes based on what are called "polar" topologies are known from the prior art, with a fixed-amplitude and fixed-phase control step.

FIG. 2a is an overview of a unitary control node with polar topology controlled by a control signal on 2N bits. The control node comprises an attenuator 201, composed of successive attenuation cells, which is configured so as to attenuate the RF input signal on the basis of the value of N bits 210 of the control signal, and a phase-shifter 202 configured so as to apply, to the attenuated RF signal, a phase shift on the basis of the value of the N other bits 211 of the control signal. The position of the attenuator 201 and of the phase-shifter 202 may be swapped.

In the examples described here and hereinafter, the control signals under consideration have a size of 2N=14 bits. This format is given by way of non-limiting illustration. In this case, N=7 bits are dedicated to controlling the attenuator 201, composed of 7 consecutive attenuation cells. Each cell is switched into an active or inactive state by a dedicated bit of the control signal. The attenuation level of the cells doubles for each cell, so as to guarantee a constant-step progression in terms of dB. In this example, it is then possible to apply $2^7=128$ levels of attenuation to the RF signal.

With MSB being the most significant bit and LSB being the least significant bit of the N dedicated bits of the control signal for the attenuator, then the attenuation step is given by the attenuation of the cell associated with the LSB, while the attenuation of the cell associated with the MSB has a value $2^{N-1}$ times this step. The value of the total amplitude dynamic range of the attenuator is therefore 2*MSB−LSB=(2N−1)*LSB.

Additionally, N=7 other bits 211 of the control signal are used to control the phase-shifter 202, which allows 128 separate phase shift levels to be applied to the signal, preferably distributed uniformly so as to cover the 360° of phase required by the array antenna system. The value of the phase step is then 360°/2N.

Depending on what is desired regarding the phase accuracy and the amplitude dynamic range sought, the distribution of the control bits between the attenuator and the phase-shifter may be modified.

FIG. 2b shows the constellation of states obtained for a control node using a polar topology, in the case of an ideal constellation, that is to say without parasitic distribution, selecting 2N=14 bits. The constellation homogeneously covers the unit circle, which corresponds to zero attenuation, and has a constant step in terms of amplitude (in dB) and in terms of phase.

Although the polar representation is perfect from a point of view of system operation due to the homogeneity of the coverage, its implementation using silicon or silicon-germanium technology is highly disadvantageous in terms of footprint and trade-off on the set of required electrical performance properties (critical RF characteristics versus DC power consumed).

This is why control nodes based on what are called "vector" topologies are also known from the prior art, with fixed-amplitude control step on the I and Q channels.

FIG. 3a is an overview of a unitary control node with vector topology controlled by a 2N=14-bit control signal. The control node comprises a quadratic divider 301 configured so as to generate, from the RF signal, an in-phase signal, commonly called channel I, and a quadrature signal, commonly called channel Q. Each channel comprises an attenuator 302/303 configured so as to attenuate the signal of the channel on the basis of the value of N−1 bits 310/311 of the control signal, and an inverter 304/305, configured so as to invert or not to invert the signal transmitted on the channel depending on the value of a bit 312/313 of the control signal. The two signals are then recombined by a combiner 306. The quadratic divider may for example take the form of a coupler used in divider mode, configured so as to generate two output channels in phase quadrature. The combiner may for example take the form of a coupler used as a combiner, the input channels of which are in phase or in phase opposition.

In some variant implementations, the positions of the attenuators and inverters on each channel may be switched. Similarly, the quadratic divider 301 may be configured so as to generate four channels: the channels I and Q, and their inverses $\bar{I}$ and $\bar{Q}$. Each channel then comprises an attenuator, the attenuators of a channel and of its inverse being controlled by the same bits of the control signal (N−1 bits 310 of the control signal for the channels I and $\bar{I}$, and N−1 bits 311 of the control signal for the channels Q and $\bar{Q}$). The combiner is then configured so as to combine two channels of the four, selected on the basis of two bits of the control signal.

In terms of implementation footprint, performance in terms of RF insertion losses and in terms of relative frequency bandwidth, the vector topology is highly advantageous in comparison with the polar topology, in particular when the implementation is carried out using silicon or silicon-germanium technology.

FIG. 3b shows the constellation of states obtained for a control node using a vector topology, in the case of an ideal constellation, that is to say without parasitic distribution, and for a control signal on 2N=14 bits. The attenuators 302/303 each comprise N−1=6 consecutive attenuation cells, each cell being controlled by a dedicated bit of the control signal. The attenuation performed by the cells doubles from one cell to the next, so as to provide an attenuation with constant step in terms of dB. In this example, it is then possible to apply 64 levels of attenuation to the RF signal on each channel, which makes it possible to describe 4096 amplitude/phase levels grouped together in one quadrant of the total constellation. The inverters 304 and 305 allow these states to be transferred to the other three quadrants. Since the attenuation dynamic range provided on each channel is limited, a cross-shaped depopulated region 320 appears along the x- and y-axes, in which the constellation comprises no points.

Vector topology-based control nodes are implemented very well using silicon or silicon-germanium technology, and exhibit good RF performance. However, the depopulated region means that the vector topology does not provide homogeneous coverage over 360° and over the whole desired dynamic range. In addition, the points of the constellation that are situated beyond the unitary circle are lost, since they actually correspond to an amplification of the signal. The constellation has to be normalized by removing all of the points located outside the unitary circle, as shown in FIG. 3c.

It is possible to reduce the size of the depopulated region without modifying the attenuation step by increasing the number of attenuation cells of the control nodes, and therefore the total attenuation dynamic range of the control node. This solution is only partially satisfactory because increasing the size of the control signal leads to an increase in the amount of data transmitted to the satellite, in the complexity of the calibration phase, in the size of the calibration tables, and in the size of the series-parallel converters used to address the bits of the control signal.

It is also possible to reduce the size of the depopulated region by increasing the step of the least significant bit of the attenuators, so as to increase the total amplitude dynamic range of the constellation for a constant number of control bits, but this solution degrades the density of the points of the constellation and therefore the resolution of the system.

French patent application FR 1,907,443 describes a control node, shown in FIG. 4a, based on a vector topology and that reduces the size of the depopulated region without modifying the control signal. To this end, it adds new attenuation cells that are controlled by the result of combinational logic implemented on bits of the control signal.

Each channel of the control node comprises an attenuator 401/402 with N−1 attenuation cells $A_i$, where i∈[1, N−1], configured so as to attenuate the radiofrequency signal by a predetermined value on the basis of the value 310/311 of N−1 dedicated bits of the control signal, and M additional attenuation cells $B_j$, where j∈[1,M]. The cells $B_j$ are activated by the result of combinational logic implemented on the bits of the control signal that are used to control the attenuation cells $A_i$, thereby making it possible to extend the amplitude dynamic range of the constellation without modifying the initial resolution set by the value of the least significant bit of the attenuation cells A (and therefore without modifying the amplitude step) or increasing number of bits of the control signal.

FIG. 4b shows the constellation of states obtained for a control node such as the one in FIG. 4a for a control signal on 2N=14 bits and where M=2, in the case of an ideal constellation. It may be seen there that the depopulated region 410 is reduced in comparison with the depopulated region in FIG. 3b.

However, this solution exhibits numerous drawbacks. A first drawback stems from the fact that some points correspond to very high attenuation levels for which coupling phenomena between adjacent control nodes may occur. These coupling phenomena are unacceptable in that the formation formed by a control node then influences the amplitude/phase of the neighbouring cells when they operate in the region with a high dynamic range, typically that in which the additional attenuation cells $B_j$ are activated.

Another drawback of this solution stems from the fact that the additional attenuation cells $B_j$ generally have high attenuation levels, such cells having non-negligible RF losses.

SUMMARY OF THE INVENTION

One aim of the invention is therefore to describe a control node for an array antenna that makes it possible to form a homogeneous amplitude/phase constellation able to be implemented effectively using silicon or silicon-germanium technology, not requiring an increase in the number of bits of the control signal or a reduction in the resolution of the constellation, with low RF losses and good robustness to coupling with adjacent control nodes of the array antenna. It therefore addresses the needs of active antenna beamforming systems that are constrained by limited storage and digital processing (calibration) capabilities, for example for on-board satellite applications.

To this end, the present invention describes a control node for an array antenna configured so as to apply an attenuation and a phase shift to a radiofrequency signal on the basis of a control signal. The control node comprises:
 a quadratic divider that takes the radiofrequency signal at input and is configured so as to deliver at least one in-phase signal and one quadrature signal on separate transmission channels,
 a combiner configured so as to generate an output radiofrequency signal by summing the signals transmitted on two of the transmission channels.

Each transmission channel comprises at least one attenuation cell configured so as to attenuate the radiofrequency signal transmitted on the channel by a predetermined value, each attenuation cell being activated on the basis of the value of a dedicated bit of the control signal. Each transmission channel furthermore comprises a first phase shift cell configured so as to apply a fixed phase shift to the radiofrequency signal transmitted on the channel, the cell being activated on the basis of the result of combinational logic implemented on bits of the control signal.

According to one embodiment, the control node comprises two separate transmission channels, one in-phase channel and one quadrature channel. Each transmission channel furthermore comprises a second phase shift cell configured so as to invert the phase of the radiofrequency signal transmitted on the channel, the second phase shift cell being activated on the basis of the value of a dedicated bit of the control signal. The second phase shift cells therefore make it possible to choose the quadrant in which the point of the constellation is located. In this embodiment, the combinational logic of the first phase shift cells is implemented on the bits of the control signal that are dedicated to activating the second phase shift cells.

In another embodiment, the quadratic divider is configured so as to deliver, respectively, on four different transmission channels, an in-phase signal, a signal inverse to the in-phase signal, a quadrature signal and a signal inverse to the quadrature signal. The combiner is then configured so as to combine the signals transmitted on two transmission channels selected from the four on the basis of two dedicated bits of the control signal. The combinational logic that controls the first phase shift cells is implemented on the bits of the control signal that are dedicated to the selection of the transmission channels by the combiner.

According to the embodiment, the combinational logic may be implemented by one of a preprogrammed table, a set of logic gates and a signal-processing processor.

Advantageously, the phase shift applied by the first phase shift cells is a non-zero phase shift less than 90° in terms of absolute value, preferably less than 45° in terms of absolute value, and even more preferably equal to 30° in terms of absolute value.

The invention also relates to a beamforming network comprising a plurality of control nodes according to one of the preceding aspects of the description, and to an array antenna comprising:
 a plurality of radiating elements configured so as to transmit a radiofrequency signal,
 one control node according to the invention per radiating element, each control node being configured so as to shape the amplitude and the phase of the radiofrequency signal transmitted by the radiating element to which it is attached on the basis of a control signal.

Lastly, the invention also relates to a satellite comprising an array antenna according to the invention.

BRIEF DESCRIPTION OF THE DRAWINGS

The invention will be better understood and other features, details and advantages will become more clearly apparent from reading the following non-limiting description, and by virtue of the following appended figures, given by way of example, among which.

Identical references may be used in different figures when they denote identical or comparable elements.

DETAILED DESCRIPTION

The control node that is the subject of the invention has a vector structure, and furthermore comprises an additional phase shift cell that is activated under the condition of combinational logic. This additional phase shift cell makes it possible to reduce the size of the depopulated region of vector constellations without requiring additional attenuation cells, without modifying the step size of the constellation, and without modifying the number of bits of the control signal.

Figure 5A:
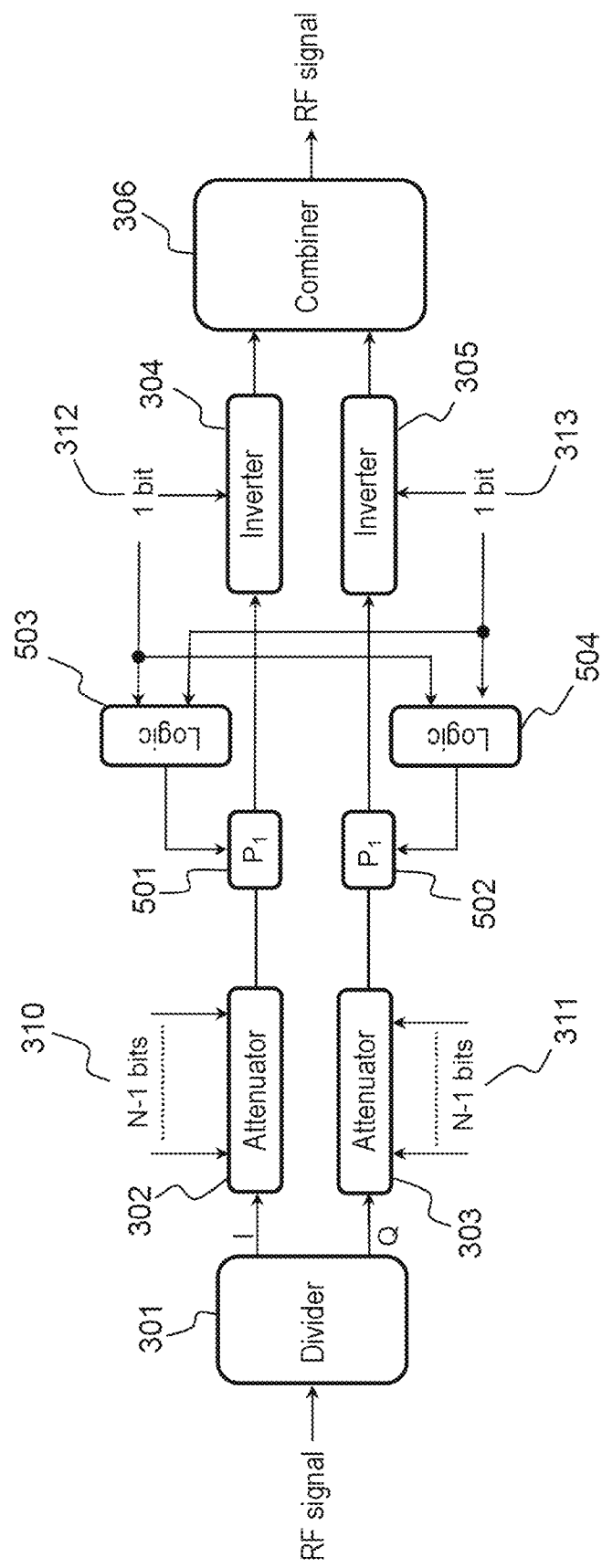
FIG. 5a is an overview of a unitary control node with vector topology for an array antenna according to one embodiment of the invention.

FIG. 5a is an overview of a unitary control node with vector topology for an array antenna according to one embodiment of the invention.

The control node according to the invention takes, at input, an RF signal to be emitted over a particular radiating element of the array antenna. It comprises a quadratic divider 301 configured so as to generate an in-phase channel I and a quadrature channel Q from the RF signal. Each channel comprises an attenuator 302/303 and an inverter 304/305. The signals are then recombined by an RF combiner 306, which sums the signals transmitted on the two channels.

The attenuator 302/303 comprises N−1 attenuation cells $A_i$, where $i \in [1, N-1]$, each attenuation cell being activated on the basis of the value 310/311 of a dedicated bit of the control signal that controls the generation of an analogue control signal that activates or deactivates the attenuation cell, so as to allow the latter to be controlled by a digital command. In order to guarantee a step of constant amplitude, the attenuation doubles for each cell.

In equivalent fashion, each inverter 304/305, which performs a phase shift of 180°, is activated on the basis of the value 312/313 of a dedicated bit of the control signal that controls the generation of an analogue control signal that activates or deactivates the attenuation cell, so as to allow the latter to be controlled by a digital command.

The elements described above correspond to the conventional architecture of a vector control node. The invention furthermore introduces a phase shift cell Pi 501/502 on each of the transmission channels. The control node furthermore comprises one or more means 503/504 for implementing combinational logic on the bits 312/313 of the control signal that are dedicated to activating the inverters 304/305. The additional phase shift cells 501 and 502 are activated on the basis of the result of the combinational logic. The combinational logic therefore makes it possible to activate the additional phase shift cells of each channel I and Q in carefully chosen quadrants of the trigonometric circle.

Figure 5B:
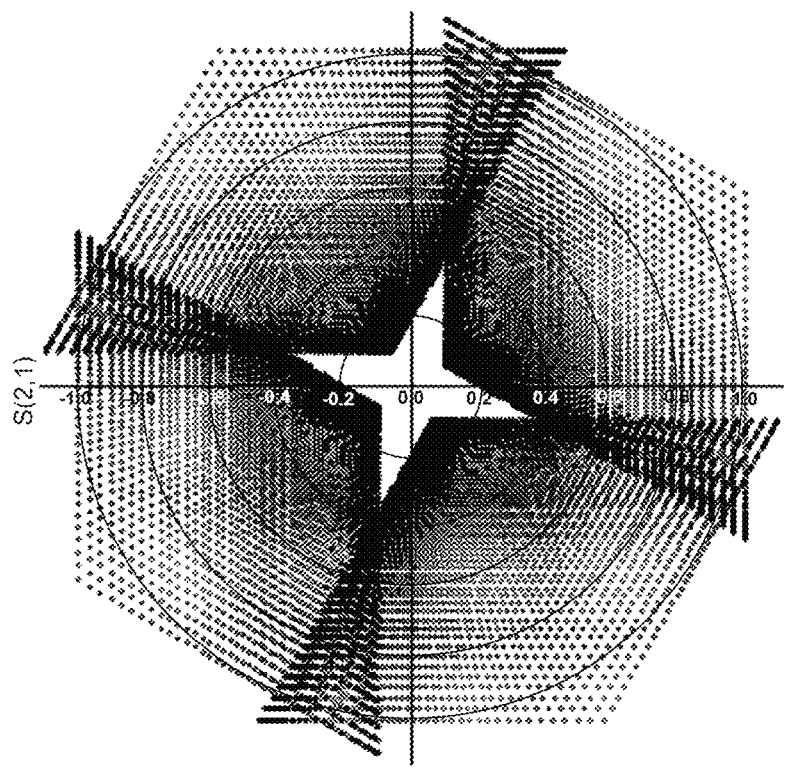
FIG. 5b shows the constellation of states associated with FIG. 5a, in the case of an ideal constellation.

FIG. 5b shows the constellation of states obtained for a control node according to the embodiment of FIG. 5a, for a control signal on 2N=14 bits and choosing phase shift cells of −30°, in the case of an ideal constellation.

The combinational logic 503 and 504 that generates the control signals for the additional phase shift cells is configured so as to activate the additional phase shift:
on the channel I when the quadrant under consideration is the one at the top right, for which the inverters 304 and 305 are deactivated, and when the quadrant under consideration is the one at the bottom left, for which the inverters 304 and 305 are activated, on the channel Q when the quadrant under consideration is the one at the bottom right or the one at the top left, for which only one of the inverters 304 and 305 is activated.

This logic may be transferred directly to the value of the two bits 312 and 313 of the control signals:
channel I: the additional phase shift cell 501 is activated when xor(bit 312, bit 313)=0
channel Q: the additional phase shift cell 502 is activated when xor(bit 312, bit 313)=1.

Other choices would have made it possible to arrive at the same result, for example considering phase shift cells of +30° and the following combinational logic:
channel I: the additional phase shift cell 501 is activated when xor(bit 312, bit 313)=1
channel Q: the additional phase shift cell 502 is activated when xor(bit 312, bit 313)=0.

It may be seen in FIG. 5b that the various quadrants of the constellation no longer form a perfect square, but rather a diamond, in which the states of the constellation are regularly distributed. The corner of the diamond closest to the centre of the constellation is no longer a right angle but rather an obtuse angle: the quadrants thus defined are thereby enlarged along one axis in comparison with the quadrants of conventional vector constellations. The amplitude resolution is unchanged in comparison with conventional vector constellations, with the amplitude step remaining constant. The phase resolution is slightly degraded but also keeps a constant step. The quadrants therefore approach one another until overlapping at some locations, this having the effect of reducing the size of the depopulated region 520 to a star-shaped region corresponding to the points of greatest attenuation, which are the least important points of the constellation that are at the origin of coupling problems for the control nodes. The assembly forms a constellation that is circumscribed within an octagon.

Figure 4A:
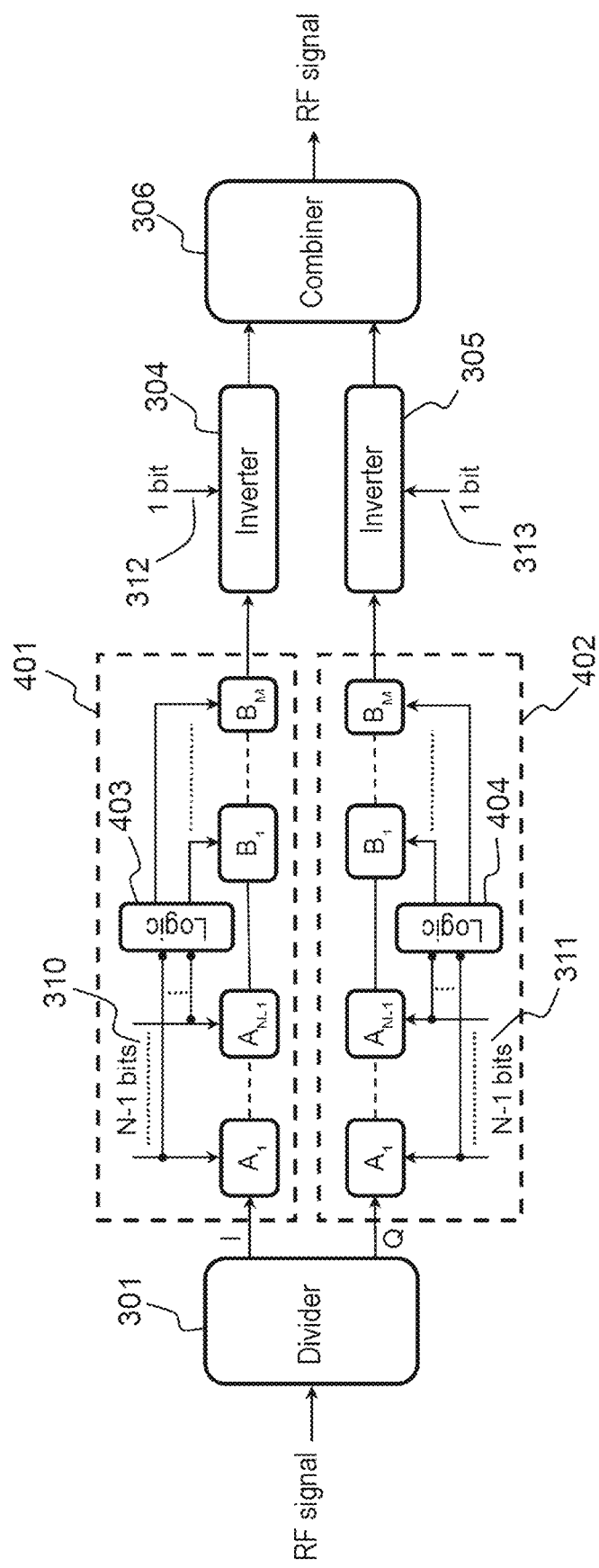
FIG. 4a is an overview of a unitary control node with vector topology for an array antenna as described in patent application FR 1,907,443.
Figure 4B:
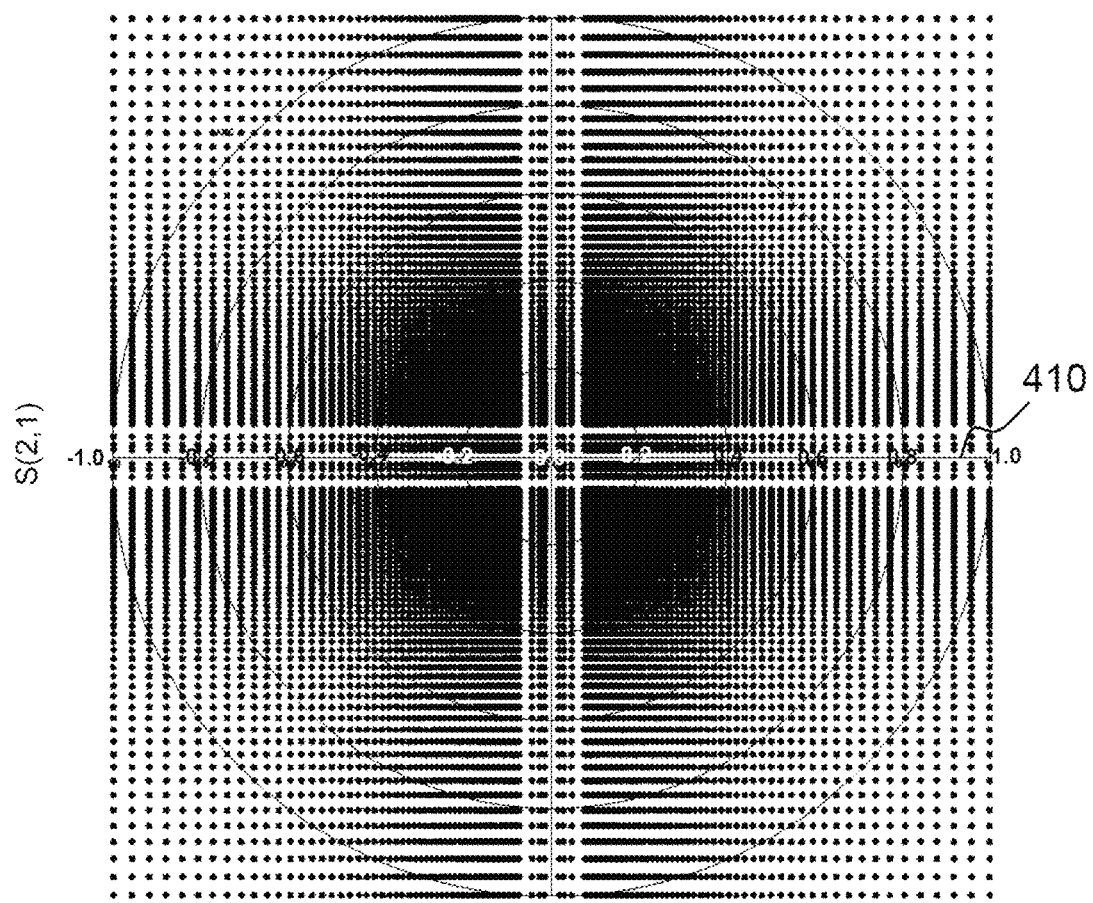
FIG. 4b shows the constellation of states associated with FIG. 4a, in the case of an ideal constellation.

The control node according to the invention therefore meets the need to fill the cross-shaped depopulated regions of vector constellations according to the prior art, without requiring additional control bits, and without inserting additional attenuation cells. It thereby overcomes problems in terms of coupling and RF losses for control nodes such as the one described in FIG. 4a. The additional cells that are inserted are low-value phase shift cells that have only very limited RF losses and are able to be implemented using silicon or silicon-germanium technology. Their low number and the fact that they are controlled by very simple combinational logic mean that they only very slightly increase the footprint of the control node. The constellation of states that is obtained makes it possible to scan 360° per amplitude and phase step of constant size, and the amplitude dynamic range is the same as that obtained for vector topologies.

In addition, the control node according to the invention is circumscribed within an octagon that tends towards a circle, thereby increasing the number of points available after normalization of the constellation in the polar circle in comparison with known vector topologies. Translating the points located at the four outer corners of the standard vector constellation to the inside of the polar circle, performed by adding additional phase shift cells, thereby increases the resolution of the vector constellation in the areas of overlap, whereas these points are lost after normalization in a standard vector constellation. The invention therefore makes it possible to significantly improve amplitude/phase accuracy in comparison with conventional vector topologies.

Figure 1:
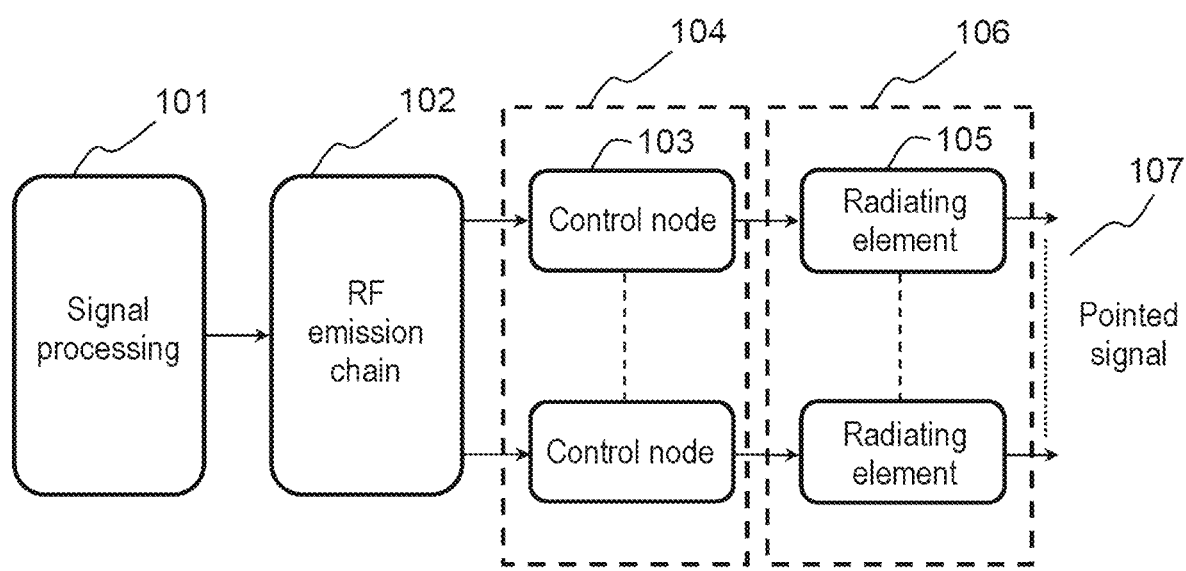
FIG. 1 summarizes the main elements in a transmission chain comprising an array antenna, at emission.
Figure 2A:
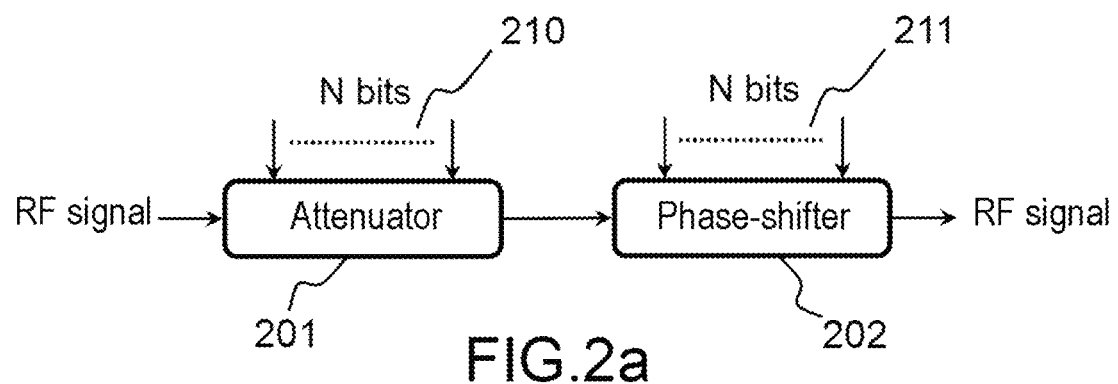
FIG. 2a is an overview of a unitary control node with polar topology for an array antenna.
Figure 2B:
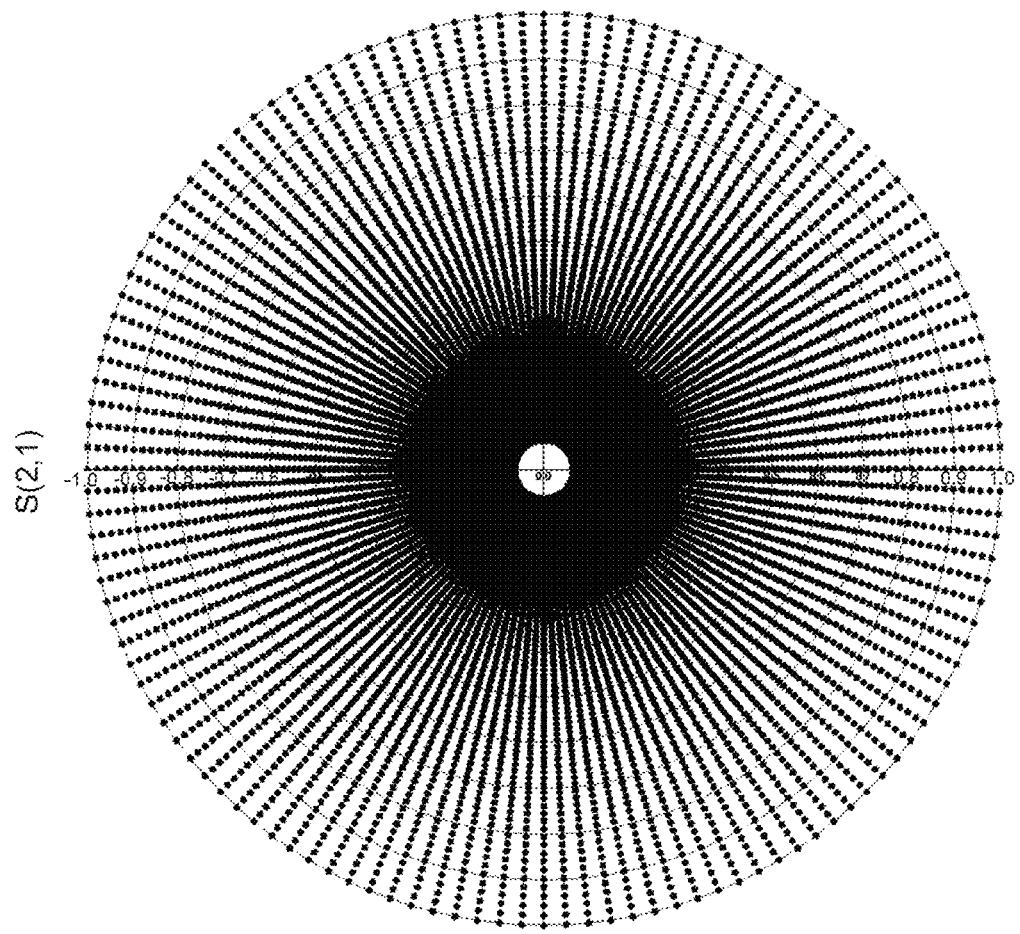
FIG. 2b shows the constellation of states associated with FIG. 2a, in the case of an ideal constellation.
Figure 3A:
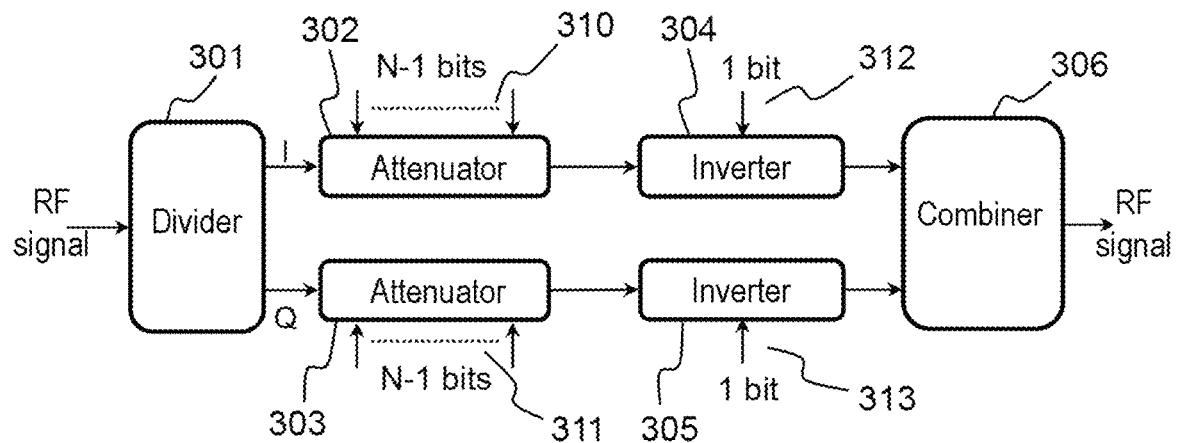
FIG. 3a is an overview of a unitary control node with vector topology for an array antenna.
Figure 3B:
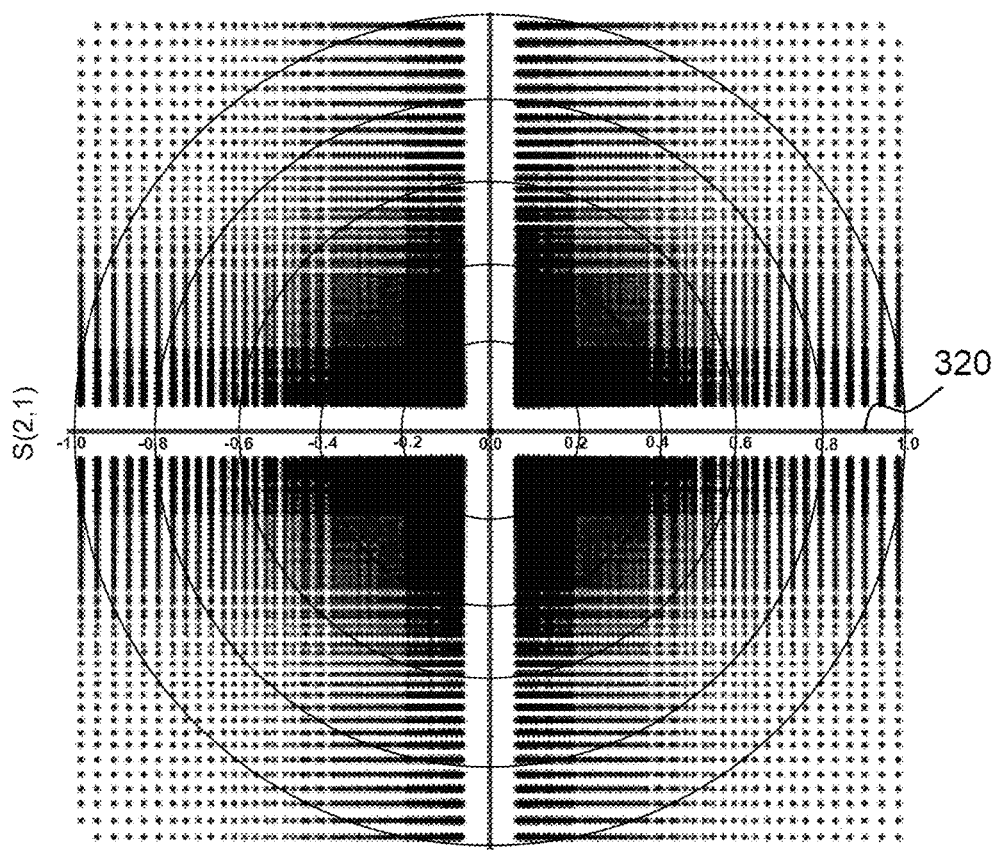
FIG. 3b shows the constellation of states associated with FIG. 3a, in the case of an ideal constellation.
Figure 3C:
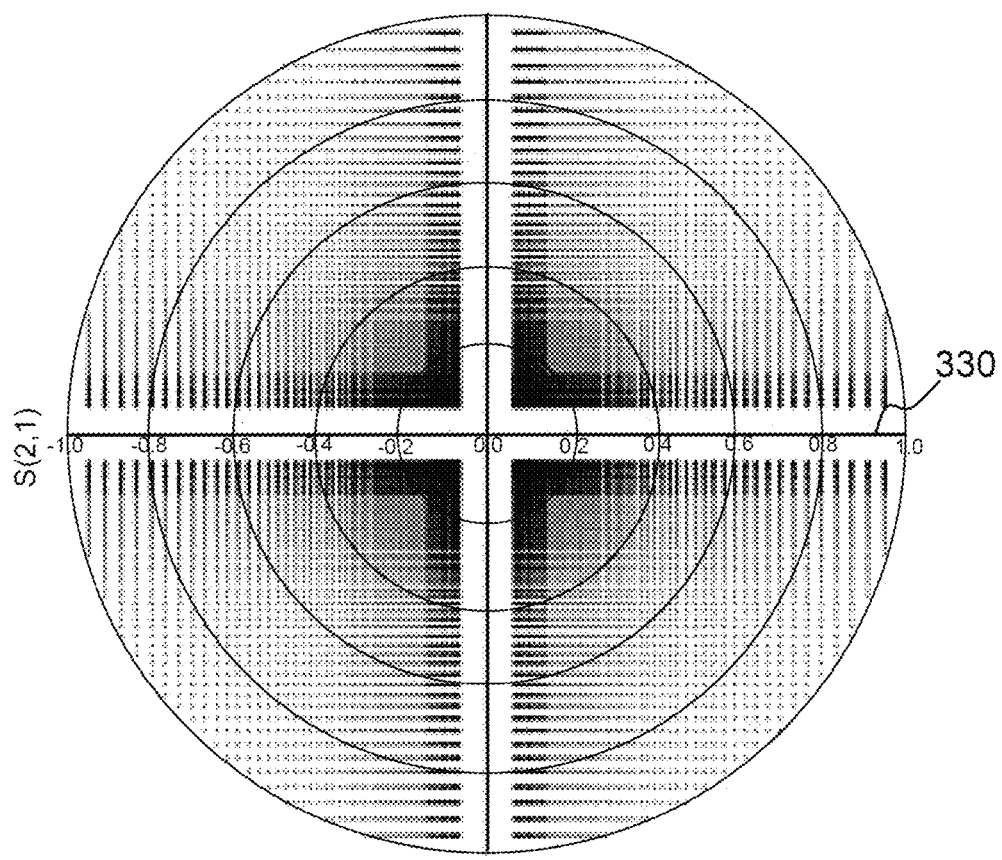
FIG. 3c shows the constellation of states from FIG. 3b after normalization.
Figure 5C:
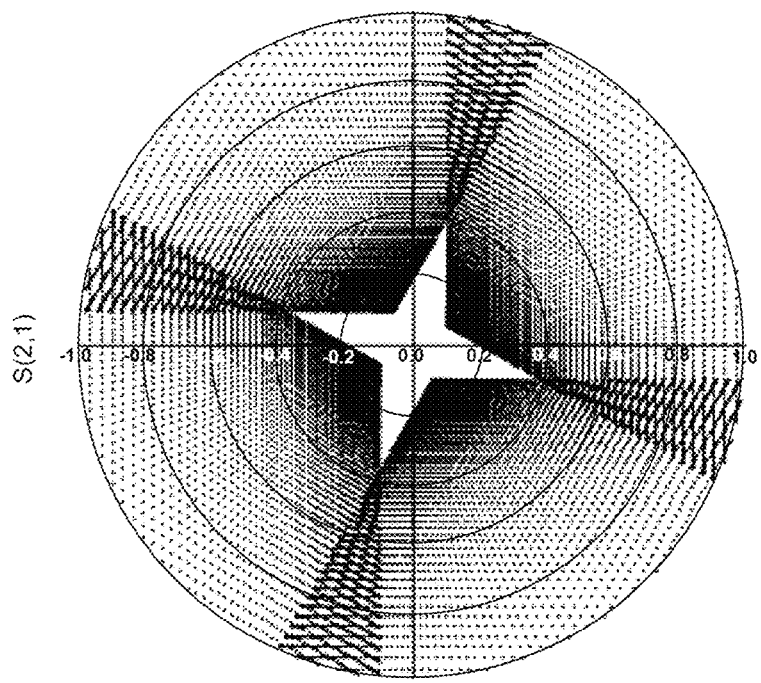
FIG. 5c shows the constellation of states from FIG. 5b after normalization.

FIG. 5c shows the constellation of states obtained for FIG. 5b after normalization. In this precise case, normalization is carried out at −4 dB. It may be seen that the number of points lost after the normalization is far lower than in the case of the improved vector topology from FIG. 3c.

The choice of the value of the additional phase shift that is applied directly affects the size of the depopulated region and the level of overlap of the various constellations. This value should therefore be evaluated on a case-by-case basis on the basis of the operational requirements, so as to achieve the best compromise between the dynamic range of the constellation and the resolution of the system. This additional phase shift is in any case less than 90° (in terms of absolute value), and typically less than 45°. In the examples given, it has a value of 30° in terms of absolute value.

The combinational logic 503/504 is very simple since it involves only XOR gates. It may be implemented by any means: a preprogrammed table, a set of logic gates or a digital computing component (such as for example a digital signal processor or DSP, or any other equivalent device for performing digital computations). The two combinational logic blocks 503 and 504 may be implemented separately or in one and the same component.

Figure 6:
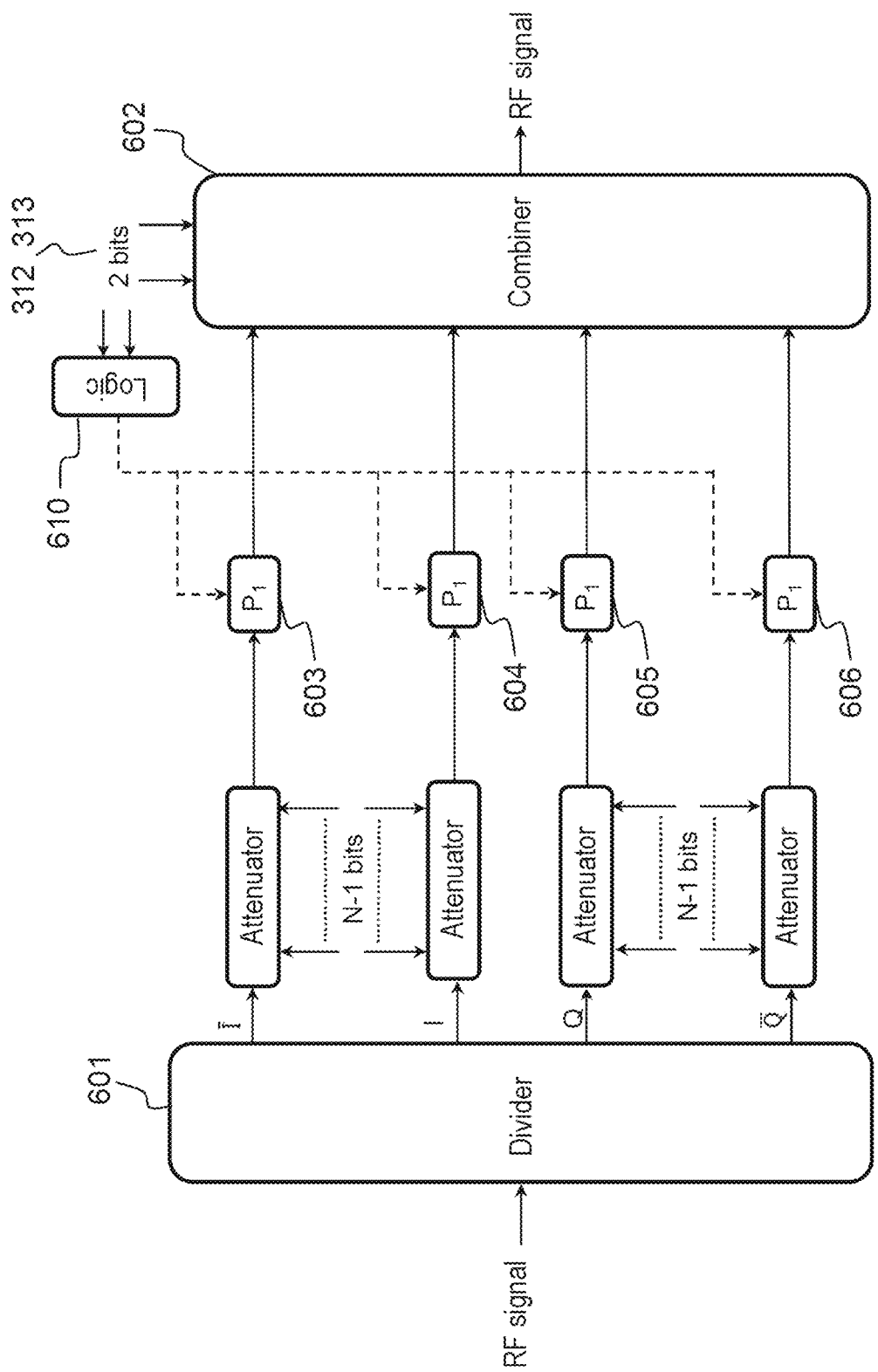
FIG. 6 is an overview of a unitary control node with vector topology for an array antenna according to another embodiment of the invention.

FIG. 6 is an overview of a control node with vector topology for an array antenna according to another embodiment of the invention.

This embodiment, which gives the same results as the one presented in FIG. 5*a*, differs therefrom in that the quadratic divider 601 is configured so as to generate four separate transmission channels from the RF signal: an in-phase channel I, a channel $\bar{I}$ inverse to the channel I, a quadrature channel Q, and a channel $\bar{Q}$ inverse to the channel Q. Each of the transmission channels comprises an attenuator with N−1 attenuation cells that is controlled by N−1 bits of the control signal, and an additional phase shift cell 603 to 606, activated by programmable logic 610. In equivalent fashion, the programmable logic may be separated into four blocks that are distributed over the various transmission channels. The control node also comprises a combiner 602 configured so as to select a first channel from the channels I and $\bar{I}$, and a second channel from the channels Q and $\bar{Q}$, and to combine these two channels in order to deliver the output RF signal of the control node. The channels are selected within the combiner based on two dedicated bits of the control signal, these two bits also being the inputs for the combinational logic 610.

Numerous variants to the described embodiments are easily conceivable to a person skilled in the art, for example by switching the positions of the attenuators and the inverters. Furthermore, the device according to the invention, in which an additional phase shift cell is added, is fully compatible with the device described in patent application FR 1,907,443, the vector control node being able to be supplemented with both attenuation cells and additional phase cells.

The invention also relates to:
a beamforming network comprising a plurality of control nodes as described by the invention. The beamforming network is placed between the radio signal emission chain and the radiating elements of an array antenna, and makes it possible to apply an amplitude and phase setpoint to the signals transmitted to each of the radiating elements of the antenna on the basis of a setpoint signal; an array antenna comprising a plurality of radiating elements 106 configured so as to transmit a radiofrequency signal, and one control node according to the invention per radiating element, each control node being configured so as to shape the amplitude and the phase of the radiofrequency signal transmitted by the radiating element to which it is attached on the basis of a control signal; a satellite comprising such an array antenna.

The invention claimed is:

1. A control node for an array antenna configured so as to apply an attenuation and a phase shift to a radiofrequency signal on the basis of a control signal, said control node comprising:
a quadratic divider that takes the radiofrequency signal at input and is configured so as to deliver at least one in-phase signal and one quadrature signal on separate transmission channels,
a combiner configured so as to generate an output radiofrequency signal by summing the signals transmitted on two of the transmission channels, each transmission channel comprising at least one attenuation cell configured so as to attenuate the radiofrequency signal transmitted on the channel by a predetermined value, each attenuation cell being activated on the basis of the value of a dedicated bit of the control signal, wherein each transmission channel furthermore comprises a first phase shift cell configured to apply a fixed phase shift to the radiofrequency signal transmitted on the channel, activated on the basis of the result of combinational logic implemented on bits of the control signal, the fixed phase shift applied by the first phase shift cells being a non-zero phase shift lower than 90° in terms of absolute value.

2. The control node according to claim 1, comprising two separate transmission channels, one in-phase channel and one quadrature channel, each transmission channel furthermore comprising a second phase shift cell configured so as to invert the phase of the radiofrequency signal transmitted on the channel, the second phase shift cell being activated on the basis of the value of a dedicated bit of the control signal, and wherein the combinational logic is implemented on the bits of the control signal that are dedicated to activating the second phase shift cells.

3. The control node according to claim 1, wherein the quadratic divider is configured so as to deliver, respectively, on four different transmission channels, an in-phase signal, a signal inverse to the in-phase signal, a quadrature signal and a signal inverse to the quadrature signal, wherein the combiner is configured so as to combine the signals transmitted on two transmission channels selected from the four on the basis of two dedicated bits of the control signal, and wherein the
combinational logic is implemented on the bits of the control signal that are dedicated to the selection of the transmission channels.

4. The control node according to claim 1, wherein the combinational logic is implemented by one of a preprogrammed table, a set of logic gates and a signal-processing processor.

5. The control node according to claim 1, wherein the phase shift applied by the first phase shift cells is a non-zero phase shift less than 45° in terms of absolute value, and substantially equal to 30° in terms of absolute value.

6. A beamforming network comprising a plurality of control nodes according to claim 1.

7. An array antenna comprising:
a plurality of radiating elements configured so as to transmit a radiofrequency signal,
one control node according to claim 1 per radiating element, each control node being configured so as to shape the amplitude and the phase of the radiofrequency signal transmitted by the radiating element to which it is attached on the basis of a control signal.

8. A satellite comprising an array antenna according to claim 7.

* * * * *